Feb. 6, 1951  A. B. BUSSMANN  2,540,608
STRAIN INSULATOR
Filed Aug. 9, 1946

INVENTOR.
Aloysius B. Bussmann
BY
Roy M. Eilers

Patented Feb. 6, 1951

2,540,608

UNITED STATES PATENT OFFICE 2,540,608

STRAIN INSULATOR

Aloysius B. Bussmann, St. Louis, Mo.

Application August 9, 1946, Serial No. 689,378

7 Claims. (Cl. 174—208)

This invention relates to improvements in insulators. More particularly this invention relates to improvements in insulators that are used to support electrically-charged wires.

It is an object of the present invention to provide improved insulators that are used to support electrically-charged wires.

In many installations of an electrical character, electrically-charged wires must be supported by suitable supporting members, and these members are customarily referred to as insulators. Where the electrically-charged wires are covered with insulating material, the primary function of the insulators is to provide the required support for the wires, and the action of the insulators in additionally increasing the electrical isolation of the electrically-charged wires is of secondary importance. In other electrical installations the electrically-charged wires are not covered with insulating material and in such installations the insulators must not only support the electrically-charged wires but they must also electrically insulate those wires from the posts or other supporting structures to which the wires and insulators are secured. Insulators of this second type are customary used with transmission-line wires, trolley wires, and wires for electric fences. Not only must insulators of this latter type having a large insulating effect to isolate the electrically-charged wires from the posts or other supporting structures but they must, where the wires are bent around obstructions or are bent to form an enclosure, have considerable mechanical strength to maintain the wires in position despite any normal forces exerted by or on the wires. Insulators of the second type must either be provided with some means that will cooperate with the wires to maintain the wires in engagement with the insulators or the insulators must themselves have a form and configuration that will enable them to hold the wires; and those insulators must also be provided with some means by which they can be secured to the supporting structures without bringing the electrically-charged wires into contact or too-close proximity with those supporting structures.

In several forms of insulators that are known today, the electrically-charged wires are maintained in engagement with the insulators by means of slots in the insulators; and the insulators themselves are secured to a post or other supporting structure by means of brackets or clamps that fit into perimetric grooves in the insulators. With these presently known slotted insulators it is usually necessary, in order to maintain the electrical isolation of the electrically-charged wires from the supporting structures, for the slotted insulators to be set and maintained in one particular position or to be positively locked in any desired position by rigid clamping means. Still other of these supporting means for presently known slotted insulators permit some rotation of the insulators relative to the supporting means; but these supporting means are objectionable since any rotation of the slotted insulators relative to the supporting means can be dangerous as that rotation can permit the electrically-charged wires to contact or too-nearly approach the supporting means, thus permitting grounding of the electrically-charged wires and the consequent charging of the posts or other supporting structures with dangerous electrical charges. The present invention obviates these objections by providing a slotted insulator which does not require a machined or cast supporting means and instead, can be secured to a post or other supporting structure by any suitable wire which has sufficient flexibility to be twisted around that structure and has sufficient strength to maintain the insulator in position. With the insulator of the present invention, the only tools that are needed for installation purposes are a man's two hands or a man's two hands and a pair of pliers. Not only does the present invention provide a slotted insulator that can be installed with ease, but it provides an insulator that can be moved relative to the supporting structure therefor without any danger of having the insulator rotate relative to its supporting means. Such an insulator has been found to maintain the electrical isolation of the electrically-charged wire under all operating conditions. It is therefore an object of the present invention to provide a slotted insulator which can be installed with ease and can be moved relative to the supporting structure therefor without any danger of having the insulator rotate relative to its supporting means.

Many of the presently known slotted insulators that are used to support electrically-charged wires have grooves therein that extend around the perimeters of the insulators and form arcs which are either precisely circular or generally circular relative to the centers of the insulators. The present invention provides a slotted insulator which has a perimetric groove with substantially non-arcuate, substantially parallel portions that effectively prevent any rotation of the insulator relative to the supporting means therefor. It is therefore an object of the present invention to provide an insulator which has a perimetric groove with substantially non-arcuate, substantially parallel portions.

Not only does the present invention provide the insulator with a perimetric groove that has substantially non-arcuate, substantially parallel portions, but it also dimensions those portions so the distance from the open end of the slot to the mid-point of the portion of the groove between the two non-arcuate portions is at least one and one quarter times as great as the distance between the non-arcuate portions. By providing this relationship for the various portions of the groove, the present invention makes certain that the insulator will not rotate relative to a loop of wire in the groove when that loop is under tension, since the sides of the loop will be closer together when the insulator is in its normal position than they will be in any other position of the insulator. It is therefore an object of the present invention to provide a grooved and slotted insulator wherein the distance from the open end of the insulator to the portion of the groove at the other end of the insulator is more than one and one quarter times as great as the distance between the side portions of the groove.

The present invention provides an insulator wherein the slot and groove have configurations that will provide a section of insulating material of substantially uniform thickness between the slot and groove, and thus provides an insulator that does not lend itself to the creation of rotative forces. It is therefore an object of the present invention to provide an insulator with a slot and groove of such configuration that they provide a substantially uniform thickness of insulating material between said slot and groove.

In some presently known slotted insulators that have perimetric grooves, the walls of the slots and grooves are provided with a curved or rounded configuration. While such configurations provide a pleasing appearance for the insulators, the rounded wall of the groove tends to act as an inclined plane and thus tends to permit the insulator-supporting means to slip out of the groove, and the rounded wall of the slot provides less surface distance between the electrically-charged wire and the insulator-supporting means than is provided by a plane wall of similar thickness. As a result, the presently known insulators which have grooves or slots with rounded configurations are not as desirable as they should be. The present invention overcomes this disadvantage and additionally increases the value of slotted insulators by providing the grooves and slots thereof with plane side walls. It is therefore an object of the present invention to provide a slotted insulator with a groove and slot that have plane side walls.

Other and further objects and advantages of the present invention will become apparent from an examination of the drawing and accompanying description.

In the drawing and accompanying description, two preferred embodiments of the present invention are shown and described but it is to be understood that these two embodiments are merely illustrative of the present invention and that the invention will be defined by the appended claims.

In the drawing Fig. 1 is a perspective view of one embodiment of the present invention.

Figure 1:
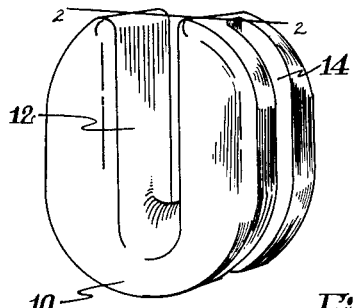

Referring to the drawing in detail, the insulator 10 is shown to be a generally U-shaped body with a centrally disposed longitudinally extending slot 12 that extends to and beyond the mid-point of the insulator. Formed in the periphery of insulator 10 is a perimetric groove 14. The perimetric groove 14 lies in a plane that is substantially perpendicular to the plane of the slot 12, and the groove extends almost completely around the outer face of the U-shaped body. The perimetric groove 14 and the slot 12 are provided with substantially plane side walls that are connected together by gently rounding bottoms. As clearly indicated by Figure 2, the perimetric groove 14 has an arcuate section of generally circular form adjacent the closed end of the U-shaped body, and it has two substantially tangentially extending, substantially non-arcuate, substantially parallel portions that extend toward the open end of the U-shaped body. It will be noted that the ends of the substantially non-arcuate portions have a slight taper, but that taper is provided merely to prevent sharp bends in the supporting wire 18 that is passed through the groove; furthermore that taper may, if desired, be eliminated.

Figure 2:
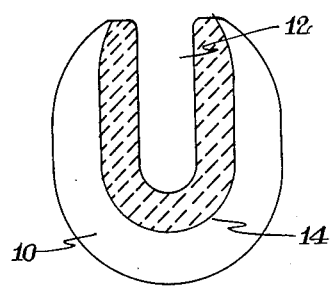
Figure 2 is a cross-sectional view of the insulator shown in Fig. 1, and it is taken along the plane indicated in Fig. 1 by the numerals 2—2.
Figure 3:
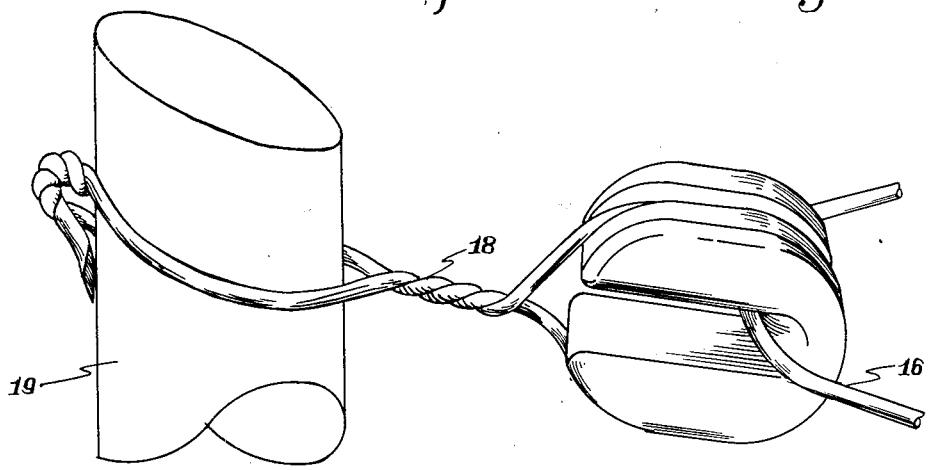
Figure 3 is a view of the insulator of Fig. 1 as it appears when used on an electric fence.

In addition it should be noted from Figure 2 that the thickness of the insulating material between the slot 12 and the groove 14 of insulator 10 is substantially uniform. By providing a section of insulating material of substantially uniform thickness between the slot 12 and the groove 14, the insulator 10 avoids a non-uniform section that might act somewhat in the manner of an inclined plane to permit the creation and application of rotative forces to the insulator 10 when tension is applied to the electrically-charged wire 16 and the supporting wire 18. As a result of this configuration the insulator 10 will not, when held in the loop formed by supporting wire 18 in the manner illustrated in Figure 3, tend to create rotative forces that would act to make the insulator rotate.

Not only does the insulator 10 not create rotative forces, but it has such a form and configuration that it will strongly resist any rotative forces that may be applied to it. The substantially non-arcuate, substantially parallel, tangentially-extending portions of the groove 14 are dimensioned so the distance between the slotted end of the insulator 10 and the mid-point of the arcuate section of the groove 14 is at least one and one quarter times as large as the distance between the non-arcuate, parallel portions of the groove 14. With this relationship between the various portions of the groove 14, the distance between the sides of the loop of wire 18 will be least when the insulator 10 is in its normal position, and it will be as much as one and one quarter times as large when the insulator is in a position perpendicular to its normal position. Where the wire 18 is under tension, as it usually is under normal conditions, rotation of the insulator 10 will be absolutely prevented since the instantaneous radius of rotation of the insulator 10 would tend to increase considerably upon rotation of the insulator; and such increase cannot occur since the loop in the wire 18 will already be under tension.

In actual practice the non-arcuate, parallel, tangentially extending portions of the groove 14 may be long enough to make the distance from the open end of the insulator to the midpoint of the arcuate portion of the groove considerably longer than one and one quarter times the distance between the non-arcuate portions of the groove, but the length of the non-arcuate portions must be long enough to make the distance from the open end of the insulator to the midpoint of the arcuate portion of the groove at least one and one quarter times as great as the distance between the non-arcuate sections of the groove. In addition, the non-arcuate sections of the groove should be greater than one half the distance between the open end of the insulator and the midpoint of the arcuate section of the groove.

Figure 4:
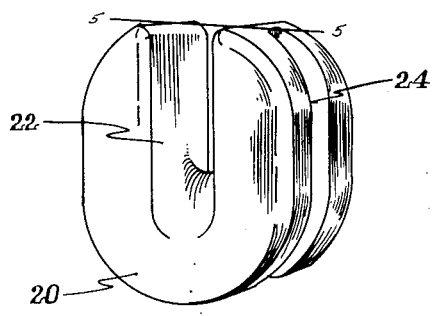
Figure 4 is a perspective view of a second embodiment of the present invention.
Figure 5:
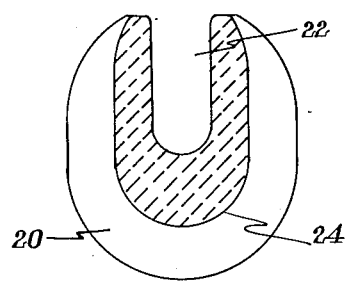
Figure 5 is a cross sectional view of the insulator shown in Figure 4 and it is taken along the plane 5—5 indicated in Figure 4.

Figures 4 and 5 show a second embodiment of the present invention, and this embodiment comprises an insulator 20 which has a slot 22 and a perimetric groove 24. The principal difference between insulator 20 and insulator 10 is that the insulating material between slot 22 and groove 24 is not substantially uniform. In all other respects the insulators are substantially the same. The added thickness of the insulator at the closed end of the slot 22 provides added strength for the insulator. While the added thickness of insulating material between the slot 22 and the groove 24 of insulator 20 may tend to act somewhat in the manner of an inclined plane, the anti-rotational action of the non-arcuate, parallel tangentially-extending portions of groove 24 completely prevents rotation of the insulator 20.

The insulators 10 and 20 will ordinarily be supported by a wire, such as wire 18 which is connected to the post 19. While the wire 18 could be insulated, it is not the customary practice to use an insulated wire; because such a wire is more expensive than a bare wire, and because most insulated wires are of copper and are thus not as strong as iron wires of the same diameter. Since the wire 16 is also a bare wire, it is very necessary that the insulators 10 and 20 fully and completely isolate the electrically-charged wire 16 from the supporting wire 18. This isolation is positively guaranteed by reason of the form and configuration of the insulators 10 and 20, and this isolation is not dependent upon the use of preformed supporting means. As soon as the wire 16 is inserted into the slot of the insulator, and as soon as the wire 18 is passed around the groove of the insulator, the insulator is ready for installation; and only the application of tension to either of the wires 16 or 18 is required to hold the insulator fixed relative to the wire 18.

Both the insulator 10 and the insulator 20 will be able to provide the electrical isolation of the wires 16 and 18 because each of them has a plane-walled groove and a plane-walled slot, each has substantially parallel, substantially non-arcuate, tangentially extending groove portions that are joined by an arcuate groove portion, in each one the distance from the open end of the slot to the midpoint of the arcuate portion of the groove is at least one and one quarter times as long as the distance between the non-arcuate groove portions, and in each one the non-arcuate portions of the grooves are more than one half the distances between the open ends of the slots and the arcuate portions of the grooves. In addition, insulator 10 has a section of insulating material between the slot 12 and the groove 14 that is of uniform thickness. The beneficial results of these advantageous features of the two embodiments of the present invention can be appreciated by an examination of Fig. 3 wherein the electrically-charged wire 16 is shown drawn tightly against the bottom of the slot 12. This is not only the normal position of the wire 16 relative to the slot 12 but it is the only position that wire 16 will assume during the normal operation and use of the fence; because the wire will act as the instantaneous center of rotation of the insulator and no matter how the insulator attempts to rotate the radius of rotation will instantly and appreciably increase. The increased radius would tend to force an appreciable spreading of the loop formed by wire 18, and this spreading would of course be resisted by the tension in the wire 18. If the distance between the open end of the slot and the midpoint of the arcuate portion of the groove was less than one and one quarter times the distance between the other portions of the groove, and if the other portions of the groove were not parallel to each other, the insulator might easily rotate despite the tension in the wire 18. However, the insulators of the present invention are not so made and they will not rotate at all when the wire 18 is under tension; and thus the insulators of the present invention can maintain the electrical isolation of the wire 16 from the wire 18 at all times during the operation of the fence.

The arrangement, provided by the present invention, of a slotted insulator and a flexible supporting wire is of especial advantage in the installation and maintenance of electric fences. The supporting wire will, under tension, conform very closely to the configuration of the perimetric groove in the insulator and will effectively prevent any rotation of the insulator relative to the supporting wire. However, the supporting wire will not rigidly position the insulator relative to the fence post, but instead the insulator can be moved to a limited extent relative to the post. With such an arrangement the supporting wire can flex and thus absorb such stresses as may be imparted to the insulator by the action of high winds on the electrically-charged wire or by the contact between animals and the insulator or the electrically-charged wire supported by the insulator. By providing for this flexing of the supporting wire, the present invention reduces the likelihood of injury to the electrically-charged wire and the insulator.

Whereas the drawing and accompanying description have shown and described two preferred embodiments of the present invention, it is obvious to those skilled in the art that various changes can be made in the form and shape of those embodiments without departing from the spirit of the invention.

What I claim is:

1. An insulator for electrically-charged wire that comprises a body of insulating material which has one axis longer than the other axes thereof, a slot that extends inwardly of said body in the direction of said longer axis, said slot having a depth greater than one half of the length of said body, and a groove in the exterior surface of said body, said groove having a central portion adjacent that portion of the body which is opposite to the outer end of said slot and having side portions thereof that extend from said central portion toward the slotted portion of said body, the distance between the outer end of the slot of said body and the midpoint of the central portion of said groove being at least one and one quarter times the distance between said side portions of said groove.

2. An insulator for electrically-charged wire that comprises a body of insulating material, said body being longer than it is wide, a slot that extends inwardly of said body and a groove in the exterior surface of said body said slot having a depth greater than one half of the length of said body, said groove having an arcuate portion adjacent that portion of said body which is opposite to the outer end of said slot, said groove having tangentially-extending, substantially non-arcuate, substantially parallel portions that extend toward the slotted portion of said body.

3. An insulator for electrically-charged wire that comprises a body of insulating material, a slot that extends inwardly of said body and a groove in the exterior of said body, said groove having a center portion adjacent that portion of the body which is opposite to the outer end of said slot and having other portions thereof that extend from said central portion toward the slotted portion of said body, said body being dimensioned so the distance between the outer end of said slot of said body and the midpoint of the central portion of the groove is at least one and one quarter times the distance between said other portions of said groove said slot having a depth at least as great as the distance between said other portion of said groove, said other portions of said groove being substantially non-arcuate.

4. An insulator for electrically-charged wire that comprises a body of insulating material, a slot that extends inwardly of said body to the midpoint of said body, and a groove in the exterior of said body, said groove having a central portion adjacent the portion of the body which is opposite to the outer end of said slot and having other portions thereof that extend from said central portion toward the slotted portion of said body, said central portion being arcuate, said other portions being substantially non-arcuate, said groove being dimensioned so the distance from the outer end of said slot to the midpoint of the central portion of said groove is more than one and one quarter times the distance between said other portions of said groove, and being dimensioned so each of said other portions is at least half as long as the distance between the outer end of said slot and the midpoint of the central portion of said groove.

5. A supporting insulator for electrically-charged wire that comprises an elongated body of insulating material, a slot that extends inwardly of said body and is parallel to the long dimension of said body, and a perimetric groove that is in a plane substantially perpendicular to the plane of the slot, said slot having plane sides and a rounded bottom, said groove having plane sides and a rounded bottom and having straight portions and an arcuate portion, said body being dimensioned so the distance through the insulating material between said slot and said straight portions of said groove is equal to or greater than the distance through the insulating material between said slot and said arcuate portion of said groove.

6. A substantially U-shaped insulator of generally elliptical shape which has an elongated narrow slot extending from one end of said insulator to and beyond the midpoint of the length of such insulator, said slot having substantially plane sides joined by a gently rounded end, and a peripherally extending groove that is in the insulator and has plane sides joined by a gently rounded bottom, said groove having an arcuate portion and a pair of substantially parallel, substantially non-arcuate portions, each of said non-arcuate portions being longer than one half the distance between the midpoint of the arcuate portion of the groove and the slotted end of said insulator.

7. A generally U-shaped insulator which has a generally elliptical shape and which has a peripherally extending groove, one end of said insulator being closed, the other end of said insulator having a slot to form the open end of said U, said groove in said insulator having two spaced portions thereof that are substantially non-arcuate and are adjacent the open end of said insulator whereby a wire that is held under tension in said groove will have its entering and leaving sections substantially parallel to each other for a distance greater than one half the distance between open end of the insulator and the midpoint of that portion of the groove which connects said spaced portions of said groove, said connecting portion of said groove and said entering and leaving sections of said groove being continuous from a point at one side of and adjacent to the open end of said U to a point at the other side of and adjacent to said open end of said U, whereby said groove can confine said wire continuously from its point of entry into said groove to its point of exit from said groove.

ALOYSIUS B. BUSSMANN.

REFERENCES CITED

The following references are of record in the file of this patent:

UNITED STATES PATENTS

| Number | Name | Date |
|---|---|---|
| 476,828 | Seymour | June 14, 1892 |
| 905,141 | Bogue | Dec. 1, 1908 |
| 1,028,104 | Fletcher | June 4, 1912 |
| 1,290,147 | Fairclough | Jan. 7, 1919 |

FOREIGN PATENTS

| Number | Country | Date |
|---|---|---|
| 580,103 | France | Aug. 21, 1924 |
| 85,371 | Austria | Sept. 10, 1921 |